United States Patent Office 2,936,081
Patented May 10, 1960

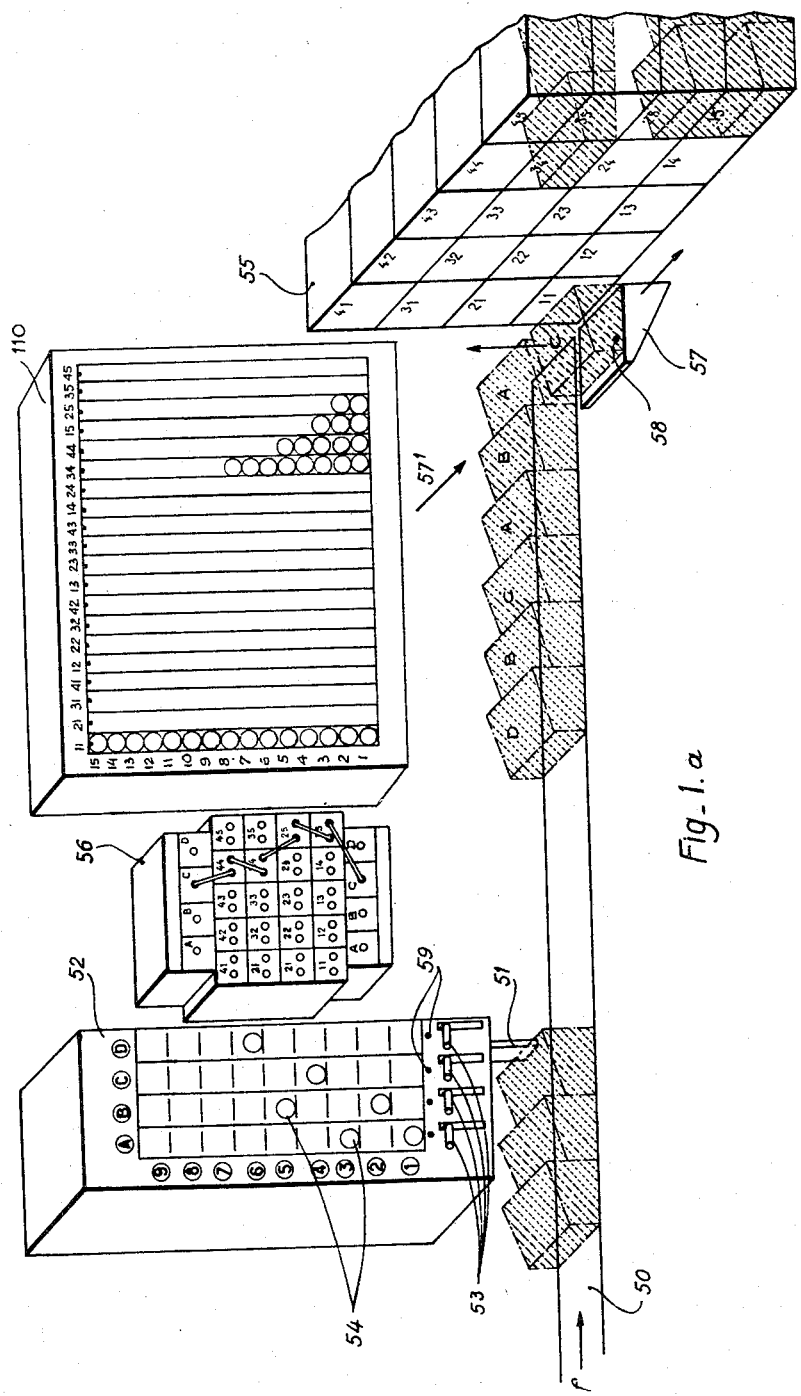
Fig_1.a

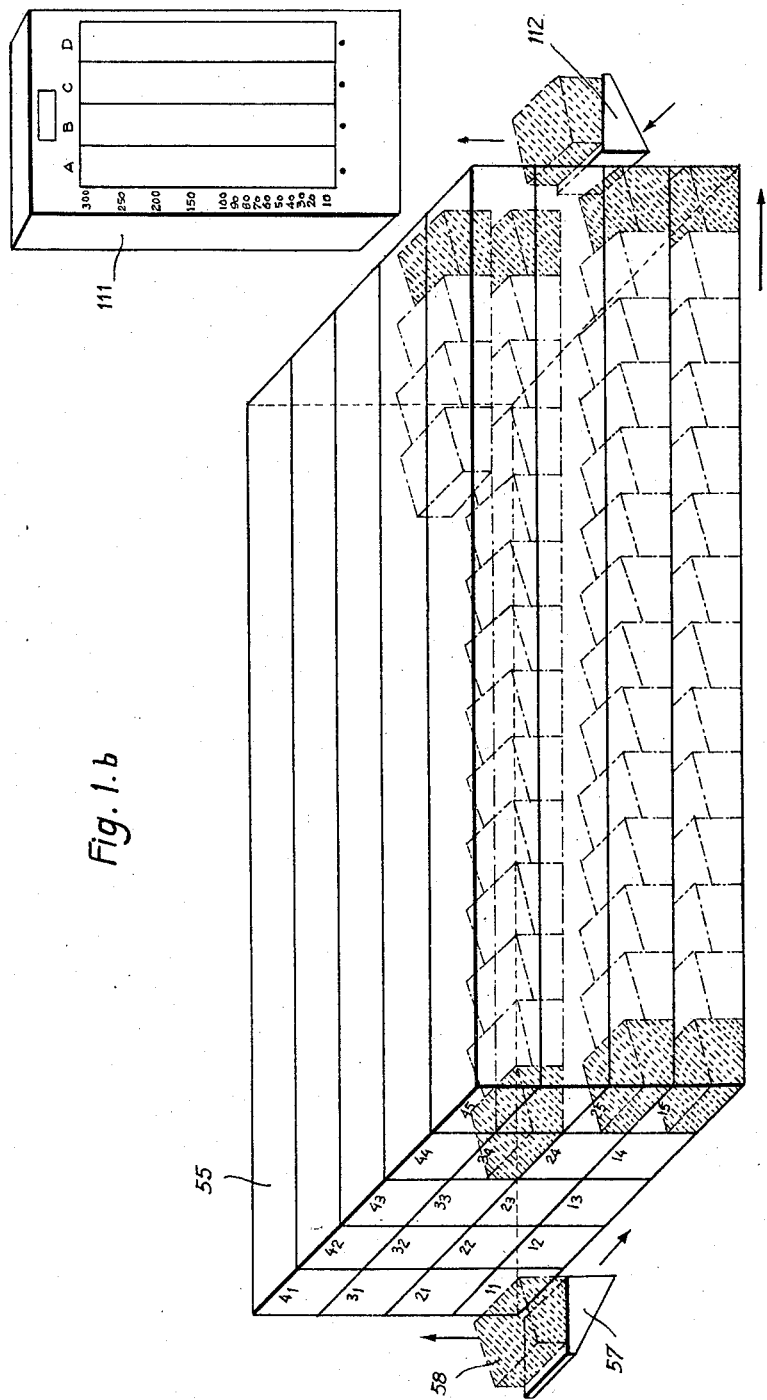

2,936,081

MEMORY DEVICE FOR STOCK CONTROL SYSTEM

Lucien Péras, Billancourt, France, assignor to Regie Nationale des Usines Renault, Billancourt (Seine), France Application September 16, 1957, Serial No. 684,121

Claims priority, application France September 21, 1956

3 Claims. (Cl. 214—11)

When articles of manufacture of the same character, having only minor differences, are delivered from a machine or production line, it is preferable to sort them before stocking them, in order to be able to quickly supply the workshops or customers by which these objects might be requested.

The present invention is concerned with improved means for rendering automatic the selective handling functions in the case of a series of parts or articles of manufacture which are delivered from a plurality of production machines or assembling lines in any order and adapted to be grouped by types or categories in one or more predetermined stocking places where they are held or stored pending their further use. A number of rather complicated devices designed for the above-mentioned handling have already been proposed. The selective handling method according to this invention is remarkable notably in that it utilizes a combination of essentially mechanical means comprising more particularly a memory device for recording the identifications of different objects.

In a handling and stocking system of this character it has proved necessary to provide a number of articles or parts between the operator (or the device by which the parts must be identified according to their types) and the transporting or transfer device effecting the loading of the objects into the stocking device, due to the fact not only that the arrivals of these objects may take place irregularly but also that the time required for the operation of the transfer device varies considerably as it depends on the distance existing between the storage bin concerned and the belt or chain conveyor, and also in order that the complete length of the belt conveyor situated between the operator and the transfer device might be utilized, for the stocking place may be relatively remote from the operator. The installation must be so arranged that the operator may leave his or her post without causing a sudden stoppage of the installation or necessitating the correction of a possible error.

Under these conditions, it is necessary to provide an apparatus adapted to keep count of the type of parts or other articles of manufacture having moved past the operator, as long as these parts have not been taken by the transporting device; as well as to supply the transporting device with such data as may be required for selecting the proper stocking bin in which the parts are to be stored, and also to enable the operator to check at any time the character and quantity of the parts which are still carried by the belt conveyor and have not yet been taken by the transporting device.

A feature of the system according to this invention, is that it comprises various devices combined to carry out the part handling and stocking functions as hereinafter disclosed.

A driven belt conveyor is provided for transferring the objects or parts from their place of manufacture to their stocking place.

A recording device responds automatically to each object and according to the type to which the object belongs when the latter moves past a predetermined point on the belt conveyor. The recording device retains and preferably visually indicates the passage of the various articles and their type until the individual articles leave the belt conveyor.

A distributor device in the system is adapted to control the filling in a predetermined order of a plurality of stocking bins or the like.

A first counter is disposed at the inlet to the bins and provides a visual indication of the extent to which each bin is filled during the stocking operation.

A transporting device takes each object or articles from the stocking belt and directs it according to its type into the proper bin according to the extent the different bins are filled.

A stocking device receives the parts for storage and consists of elongated, tunnel-shaped bins in which the objects may be introduced at one end and taken from the other end.

Another counter is disposed at the outlet end which constitutes the repeater of the inlet counter.

A device takes the objects from bins selected by an operator and transfers them to their place of subsequent use.

According to a preferred form of embodiment of the invention the recording device is disposed on the conveyor feeding the articles of manufacture so as to stop them during their feed movement and is controlled by an operator entrusted with their stocking and effecting their identification. The identification of the articles is recorded in a visible manner and according to the order of passage of the articles when the operator actuates the element of the device which corresponds to each acknowledged category in view of releasing these objects one by one towards their destination.

Thus, the identified parts or articles remain recorded in this order until they are transferred to or loaded on a transporting member or device, this loading operation being effected automatically and utilized for producing a corresponding cancellation on the memory recording device. The cancellation members act upon an electrical distributor the connections of which, established beforehand by the operator, cause the parts to be transported towards the stocking places provided for their categories.

From the following description it will be seen that this identification memory recording device is almost completely mechanical, except for an electromagnet and a motor, and that it provides a substantial simplification over known electric computers and accounting machines the complexity of which is a frequent source of trouble, shut-downs and substantial maintenance expenses.

Now the device of this invention is on the one hand considerably cheaper to manufacture and on the other hand much more reliable than the aforesaid known apparatus.

The specific features and advantages of the invention will appear more clearly as the following description proceeds with reference to the accompanying drawings illustrating diagrammatically by way of example a typical embodiment of the invention. In the drawings:

Figures 1a and 1b are diagrammatic perspective views showing a handling and stocking installation constructed according to the teachings of this invention;

Figure 1 illustrates diagrammatically a handling and stocking installation constructed in accordance with the teachings of this invention and applicable for example, to the handling and stocking of automobile engines as they are delivered from a production or assembling line.

Figure 2:
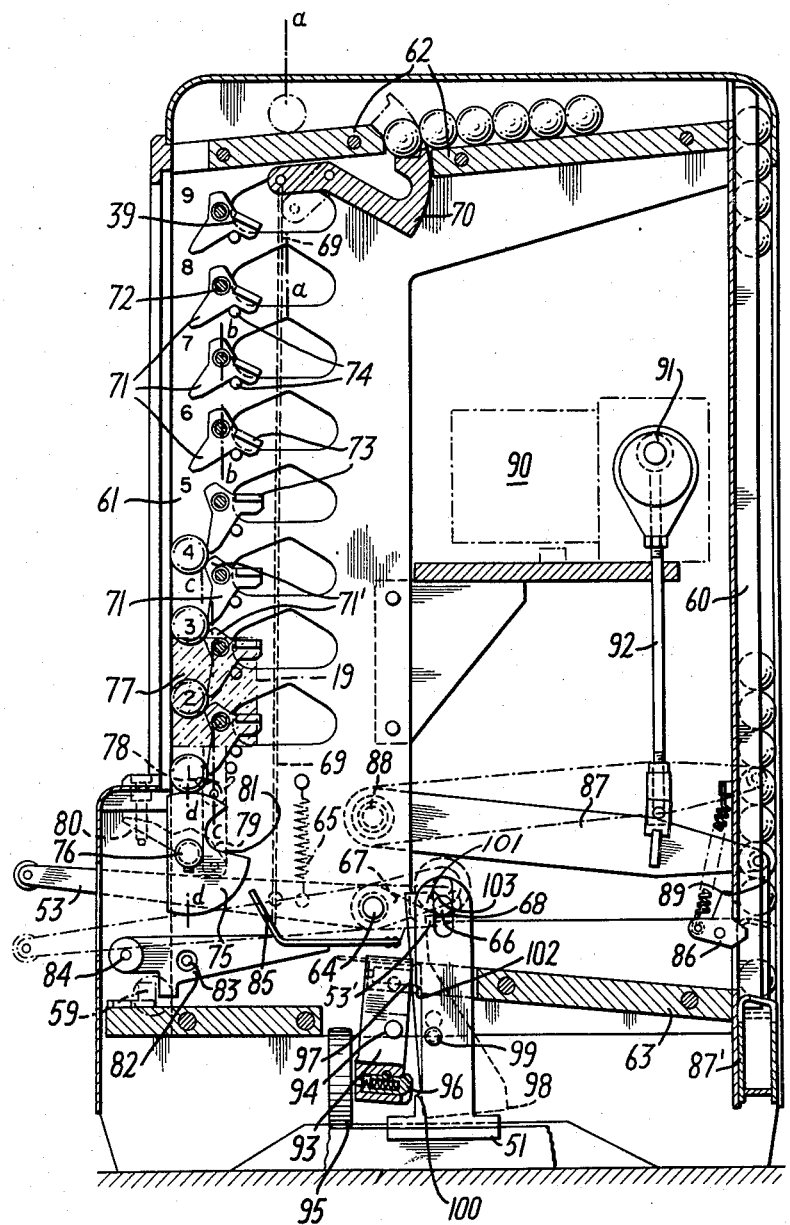
Figure 2 is a sectional view taken along the medial plane of one of the several vertical, parallel and identical circuits constituting the recording device.

The engines of several types A, B, C, D issuing from the assembling lines in any order are directed towards the stocking station by a travelling conveyor 50 of any suitable type (for example a friction-driven roller conveyor). These engines are stopped during their travel by a stop member 51 pertaining to a recording device 52. The operator entrusted with the stocking of these engines releases them one by one by actuating one of several levers 53 controlling the stop member 51, that is, the lever corresponding to one of the columns A, B, C, D according to the identification made by him of the engine to be released.

The device 52 is so arranged that when the levers 53 are actuated balls 54 are caused to descend in the columns A, B, C, D according to the type of engine, and to stop at tiers or levels according to the order in which these engines arrive. If desired, other bodies of proper shape and material to permit an easy handling may be substituted for these balls. However, to facilitate the disclosure it will be assumed hereafter that balls have been selected for this specific use. Therefore, it will be seen that the six engines identified and stopped beyond or downstream of the stop member 51, which are marked A, B, A, C, B, D and await their turn for being taken by a transfer device 57, are recorded in this order by the balls distributed at the different levels 1 to 6 in columns corresponding to the type of these engines. The number of levels, 9 in the example illustrated, corresponds to the number of engines or engine blocks that can be disposed beyond the stop number 51 and must not be less than this number in order to avoid any action tending to release a non-recorded engine.

A stocking station 55, Fig. 1b, the capacity of which is subordinate to the engine input and output rates, consists in this example of twenty compartments or bins each designated by a number thereon. The first figure of each bin designates the tier and the other the row or column to which the bins belong.

An electric distributor 56 (Fig. 1a) consists of numbered bins the arrangement of which corresponds to that of the tunnels in the stocking station 55, so that the operator can select either beforehand or if desired as a function of needs, the bins in which the engines of a given type are stocked by the sucessive distributions. This selection is effected by using connecting plugs or jacks as illustrated in the case of type C, wherein the Input bin C is connected to the bin 15 of the first tunnel to be filled, this bin 15 being then connected to the next bin 25, and so forth up to the Output bin C.

The engines are introduced automatically into the tunnels by means of a transfer device consisting for example of a lift conveyor 57 on which the engines identified and stopped are sucessively pushed by a suitable device operating in the direction of the arrow 57¹.

Each engine thus pushed onto the transfer device 57 actuates a contact 58 adapted to release the ball 54 indicating its position so that this ball will drop to the next lower tier of the recording device, all the other balls in the column being thus allowed to descend by one tier; thus, in the present case, it is clear that the C-engine positioned on the transfer device 57 is already cancelled from the recording device.

Then, the movement of this ball actuates one of the contacts 59 of the recording device, that is, the contact corresponding to the type of engine carried by the transfer device, and this contact, in connection with the corresponding circuit of the electrical distributor 56, controls the operation of the lift conveyor towards the tunnel being filled among those intended for receiving the engines of the type considered.

There is also provided a device 110 for counting the engine introduced into the tunnels, with ball circuits providing a visual indication for the operator of the extent to which these tunnels are filled. Another operator controls the distribution of the engines as requested and checks another ball counter 111 at the output end of the tunnels, the circuits of this other counter being connected to the control circuit of a transfer device 112 similar to the transfer device 57 so that he can cause the requisite quantity of engines to be loaded onto a discharge conveyor.

Referring more particularly to Fig. 2 of the drawings it will be seen that the recording device illustrated therein is shown in sectional view taken upon the medial plane of one of its ball circuits 54. The number of closed circuits is selected according to the number of engine types, which is four in the present case, that is, A, B, C and D.

Figure 3:
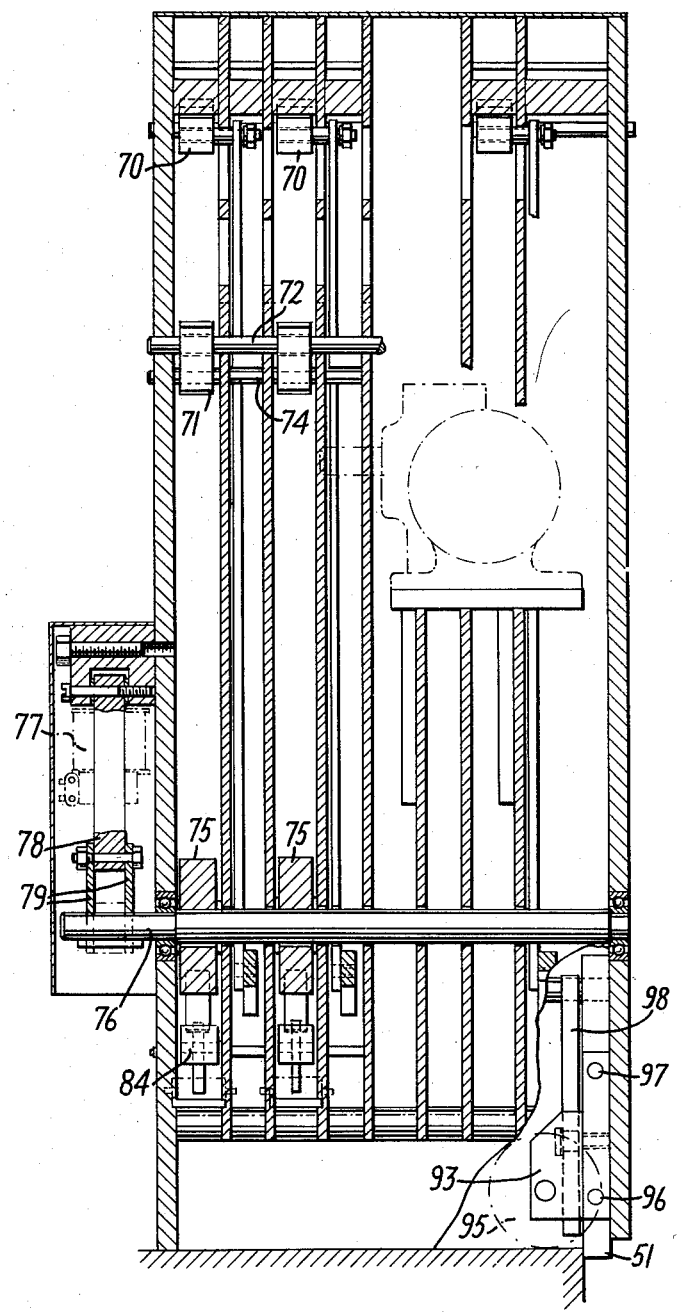
Figure 3 is another sectional view of the device, taken along the broken line a—a, b—b, c—c, and d—d of Fig. 2.

These circuits are four-sided and arranged in vertical parallel planes (see Fig. 3). They comprise two vertical portions 60, 61 constituting ball columns, the balls in the rear column move upwards and those in the front column move downwards, and two inclined portions 62, 63 lead the balls by gravity from one column to the other. The front columns of the various ball circuits are visible to the operator and as shown the device is so designed and arranged that the distribution of the balls by circuits and tiers constitutes a memory system providing a visible indication of the identified engines carried by the conveyor beyond the recording device.

Of course, as each engine can have only one destination, each tier of the recording device which corresponds to one type must contain only one indication, that is, one ball in case there is one column per destination, or several balls if the orders are recorded by means of a binary system or the like.

The first system will be described hereafter by way of example, the other system requiring in certain cases the presence of a pilot-ball at each tier.

The recording of the identifications results from the actuation of the levers 53 which at the same time releases the recorded engine retained by the stop member 51 and permits the downward movement of one ball in the corresponding column. To this end the levers 53 are fulcrumed separately on a shaft 64, and ends projecting from the front face of the apparatus are constantly urged upwardly by a separate traction spring 65. These levers are provided at their inner ends with heels 53¹ engaging the underside of a shaft 66 carried by a series of rockers 67 also pivoted on the shaft 64. The shaft 66 is normally urged downwardly. Moreover, this shaft 66 has one end extending through a slot 68 formed in the stop member 51. In addition, each of the aforesaid levers 53 is connected through a pull rod 69 to a pivoted bar 70 associated with the upper inclined portion of the relevant ball circuit. This bar is so designed that it permits the passage of only one ball at a time from the rear element of the inclined portion 62 fed from the ascending column 60 to the front, slightly raised element of this portion 62. The balls fall from this last-mentioned element into the front column 61.

If the identification is obtained through the presence of a single ball, the levers 53 are interlocked to prevent the actuation of more than one lever at a time. The interlocking arrangement provided for this purpose may have the form of the known devices utilized in certain typewriters to prevent double-striking.

Thus, in a first stage of the recording operation when the operator actuates the lever 53 corresponding to the type of engine he releases by raising the stop member 51, the bar 70 causes at the same time a ball to drop into the visible column of the circuit in question.

In order to arrange the balls in tiers according to their order of passage, which is the order of passage of the engines, pawls 71 are disposed in vertical rows in each column A, B, C or D, and operatively connected to one another by tier about their pivot pins 72. These pawls are preferably interconnected by a linking bar 73 acting as a counterweight normally urging these pawls in abutment against an underlying rod 74, this arrangement imparting a greater sensitivity than that resulting from a keying on the pivot pins 72.

These pawls 71 are so arranged as to retract themselves by tiers by tilting forwards when a ball falls through the front column of one of the circuits A, B, C, D. They are caused to resume their initial position by the influence of the rear counterweight after the passage of the ball, but they are so shaped that a ball stopped at their specific tier maintains the pawls tilted forwards so that their heads 71¹ will prevent the next ball from falling and stop it at the next higher tier, irrespective of the column in which this ball is dropped. Of course, some other means must be provided to stop the ball at the level of the lowermost tier, for example in the form of rotary drums 75 for discharging the balls. These drums are located at the bottom of each column and keyed on a common shaft 76. The shaft 76 is adapted to be actuated by means of an electromagnet 77 the movable member or plunger 78 of which is connected to a link 79 pivoted at its other end on a lever 80 mounted in turn on said shaft 76.

Thus, when the engine, which is the first to be stocked and to which corresponds a ball in tier 1, engages the transfer device 57 and actuates the contactor 58, the latter causes the electromagnet 77 to be energized, so that one of the drums 75 is rotated and receives in its notch 81 the ball from the overlying tier 1. Moreover, as the electromagnet is of the self de-energizing type, is resumes immediately its inoperative position and consequently as the drum concerned has released the ball it also resumes the position in which it is shown in Fig. 2.

Under these conditions, the ball in tier 2 descends to tier 1 and so forth by successively releasing the pawls at each tier. If desired, this pawl escapement may be replaced by a lever-escapement controlled by an electromagnet.

Each ball dropped by one of the drums 75 engages one of the rockers 82 disposed at the bottom of the front columns 61. These rockers are mounted separately for pivotal movement on a common shaft 83 and each cooperating with a contact 59 from which they are normally held away by a counterweight 84.

Thus, the released ball corresponding to the identified engine positioned on the transfer device 57 will fall onto the guide ramp 85 of rocker 82 and cause the actuation of the corresponding contact 59 causing, through the electrical distributor 56, the movement of the transfer device 57 towards the bin adapted to receive engines of this type. This released ball will then roll along the slant portion 63 of the circuit towards the bottom of the rear column 60 constantly filled with balls retained by a spring-loaded pawl 86 and wherein this ball is to be re-introduced.

To this end, a horizontal bar 87' constantly reciprocated in a vertical plane is positioned at the bottom of the circuit portion 63, the amplitude of movement of this bar is such that it can cause the lowermost or freshly released ball to clear the pawl 86 and be incorporated in the complete column 60. This horizontal bar underlies all the vertical columns 60 is actuated by a frame-like member 87 pivoted on a horizontal pin 88 and supports this bar through the medium of pivoted lugs 89. The frame-like member is driven from a motor and a reducing-gear unit 90 through an eccentric 91 and a connecting-rod 92.

On the other hand, the ball thus re-introduced in the filled column 60 will automatically cause the uppermost ball in this column to roll on the slant portion 62 of the ball circuit. This ball will engage the last ball in this upper circuit portion 60, the number of balls already present in this portion depending on the degree of filling of the front column 61 of the circuit. The number of balls that can be placed in advance of the bar 70 must be greater than the number of tiers that may be possibly fed, that is, at least ten in the example illustrated.

As the operator cannot be expected to be infallible, the cancellation of identification errors is provided for so that the latter will not become irremediable in the storage stage.

In this case, all the visible columns 61 are emptied by manually operating the lever 80 causing in turn the drums 75 to rotate, after having broken the circuits passing through the contacts 59. A safety system (not shown) is provided to prevent the manual actuation of lever 80 unless these circuits have previously been opened. Then the identifications are resumed in the order corresponding to the passage of the different engines stopped on the conveyor system beyond the recording device by actuating the levers 53. A manually-actuated stop member (not shown) is provided to keep the parts or engines in advance of the device on account of the successive retractions of the stop member 51 which are caused by this operation.

Finally, a safety device is provided to prevent any untimely actuation of the levers 53. This device may consist of means permitting the actuation of these levers 53 only when an engine engages the stop member 51 of the device, so that the operator is compelled to record the identifications at the rate of delivery of the engines, not faster.

This system comprises an anchor 93 fulcrumed at 94 and actuatable by the passing engines through a follower in the form of a contact roller 95. This anchor is adapted to lock at the proper time the stop member 51 in its raised or lowered position through the medium of spring-loaded pins 96, 97 engaging this stop member 51. In addition, it is adapted to actuate a hook member 98 fulcrumed on a pin 99 carried by the stop member 51 and adapted to engage the shaft 66 of the rockers 67 so as to indirectly lock the operating levers against motion during a predetermined time period.

The operation of this safety arrangement is as follows: when no engine is present just in advance of the stop member 51, the latter is in its lower position as well as the roller follower 95 of the anchor member 93; consequently, the spring-loaded pin 96 engages the lower notch 100 of the stop member 51 to prevent the latter from moving upwards. Under these conditions the stop member 51, which bears with its slot 68 on the rocker shaft 66, cause the rockers 67 and levers 53 to be indirectly locked in their lower position, while the hook 98 is engaged by the anchor projection or stop 101 and kept away from the shaft 66.

When an engine is presented before the stop member 51 the roller follower 95 situated slightly in advance thereof is lifted by the engine and the anchor 93 tilts the release the spring-loaded pin 96 from the stop member 51, which in the absence of an engine has remained in its lower position, and may thus be raised at the proper time since its release will permit the operation of the lever 53 corresponding to the identification effected by the operator.

Upon completion of the movement permitting the passage of the engine, the stop member 51 is locked in its higher position by the other spring-loaded pin 97 engaging the underside of the upper notch 102, for the anchor is retained in its tilted position by the roller follower 95 engaging the engine concerned. When the operator releases the lever 53, the latter is returned to its initial position by its spring 65 and the rockers drop back until their shaft 66 bears again on the lower end of the slot 68 of the stop member 51. The hook 98, with respect to which the stop 101 is positioned a short distance away having been raised by the stop member 51, will then engage the flat face 103 formed on the rocker shaft 66 now dropped to the bottom of the slot. This hook 98 will thus prevent any further operation of the levers 53 during the passage of the engine, until the roller follower 95 drops again and causes the reverse tilting of the anchor to free said hook, unlock the stop member from its upper position and re-lock it in its lower position before the passage of a next engine.

As a result, the device is characterized by a particularly efficient safety of operation since the levers cannot be actuated and therefore no recording can be effected unless an engine is present and stopped by the stop member 51, and unless the roller follower 95 is raised by this engine to be recorded, this arrangement preventing under the best possible conditions any untimely or incorrect manoeuvre from the operator.

Of course, the typical form of embodiment of the invention which is shown in the attached drawings and described hereinabove is given by way of example only, for it will be readily understood that the number of ball circuits and stopping tiers may be varied at will, and that in certain specific applications an order may be omitted upon arrival of the balls at any one or more tiers of the recorder, as contrasted with the emission effected at the outlet of the lower tier as described hereabove, as will occur to anybody conversant with the art; besides, many other modifications and alterations may be brought to the embodiment shown and described herein without departing from the spirit and scope of the invention as set forth in the appended claims.

What I claim as new is:

1. In a semi-automatic stock control system for receiving substantially alike articles of different type designations from a production line and storing them according to type, the system having a driven conveyor for conveying the articles thereon, in combination with said conveyor a memory unit having a stop operable to stop the articles individually and successively at a given area on the conveyor, means in said memory unit operable according to types of articles at said stop to cause said stop to release the articles individually in the same sequence in which they were stopped, means in said memory unit responsive to the last-mentioned means automatically operable to visually indicate each type of article released when said stop is actuated and to designate and visually record the number of articles of any type disposed on the conveyor between said unit and a second area on the conveyor downstream of said unit, said means to visually indicate and record each type of article released comprising a plurality of separate elements movable in a continuous closed circuit into visible individual columns each representative of one of the various types of said articles, each element being representative of an article, means forming the continuous circuit and defining columns representative of the various types of articles, means for moving the elements along in said circuits and distributing the elements in cooperation with the force of gravity in a proper one of said columns one-by-one each time an article is released and in such a manner that only the total number of elements are in a column that represent the total number of an individual type of article that has been released by said stop means over a predetermined number of releases and means for generating discrete command signals respectively representative of given areas corresponding to the type of articles and in which the articles are to be stored by type each time an article is removed from said second area.

2. In a semi-automatic stock control system according to claim 1, in which said memory unit includes means for insuring said means operable to cause said stop to release the articles is rendered inoperable in the absence of an article at said stop thereby to preclude inadvertent recordation.

3. In a semi-automatic stock control system according to claim 1, in which said memory unit includes means responsive to the removal of articles from the conveyor second area downstream of the unit for removing elements from the visible columns according to the type of article removed and means for causing the elements when removed from the visible columns to cooperate with the means for generating command signals to initiate said discrete signals.

References Cited in the file of this patent

UNITED STATES PATENTS

| | | |
|---|---|---|
| 1,868,894 | Glahn | July 26, 1932 |
| 2,066,702 | Snyder | Jan. 5, 1937 |
| 2,728,466 | Postlewaite | Dec. 27, 1955 |